United States Patent [19]
Plantinga et al.

[11] Patent Number: 5,988,973
[45] Date of Patent: Nov. 23, 1999

[54] VEHICLE SEAT RAMP

[75] Inventors: Paul G. Plantinga, St. Clair Shores; James K. Rafferty, Lapeer; Gregory B. Reeves, Sterling Heights, all of Mich.

[73] Assignee: Chrysler Corporation, Auburn Hills, Mich.

[21] Appl. No.: 08/698,283

[22] Filed: Aug. 14, 1996

Related U.S. Application Data

[63] Continuation-in-part of application No. 08/538,523, Oct. 3, 1995, abandoned.

[51] Int. Cl.$^6$ .................................................. B60P 1/43
[52] U.S. Cl. ...................................... 414/537; 14/71.1
[58] Field of Search ................................. 414/537, 538; 14/69.5, 71.1; 296/65.03, 68

[56] References Cited

U.S. PATENT DOCUMENTS

| | | | |
|---|---|---|---|
| 2,589,922 | 3/1952 | Bowman | 287/20 |
| 2,605,064 | 7/1952 | Davis | 244/118 |
| 3,652,050 | 3/1972 | Marrujo et al. | 248/429 |
| 3,711,882 | 1/1973 | Iller | 14/72 |
| 3,756,440 | 9/1973 | Raap et al. | 414/537 |
| 4,003,483 | 1/1977 | Fulton | 14/71.1 |
| 4,078,678 | 3/1978 | Tordella | 214/85 |
| 4,759,580 | 7/1988 | Berklich, Jr. et al. | 296/65 |
| 4,836,597 | 6/1989 | Izumida | 296/63 |
| 4,978,097 | 12/1990 | Froutzis | 248/503.1 |
| 5,120,103 | 6/1992 | Kave | 296/19 |
| 5,160,236 | 11/1992 | Redding et al. | 414/537 |
| 5,325,558 | 7/1994 | Labreche | 14/69.5 |
| 5,331,701 | 7/1994 | Chase et al. | 14/71.1 |
| 5,372,398 | 12/1994 | Aneiros et al. | 296/65.1 |
| 5,380,144 | 1/1995 | Smith et al. | 414/537 |
| 5,393,192 | 2/1995 | Hall et al. | 414/537 |
| 5,536,058 | 7/1996 | Otis . | |

*Primary Examiner*—Thomas J. Brahan
*Attorney, Agent, or Firm*—Kenneth H. Maclean

[57] ABSTRACT

A seat ramp is provided for effectuating the insertion and removal of vehicle seats. The removal ramp has at least one track member with an arcuate vehicle engagement portion, a surface engagement portion opposite the arcuate vehicle engagement portion, a mid portion integrally formed between the arcuate vehicle engagement portion and the surface engagement portion, and a sleeve attached underneath the track member adjacent to the arcuate vehicle engagement portion. A track retention apparatus is attached to the vehicle and has a cross member that extends through the sleeve of, and is perpendicular to, the track member. Once inserted onto the cross member, the track member is slidable along the cross member. A device is also provided for attaching the track retention apparatus to the vehicle.

2 Claims, 3 Drawing Sheets

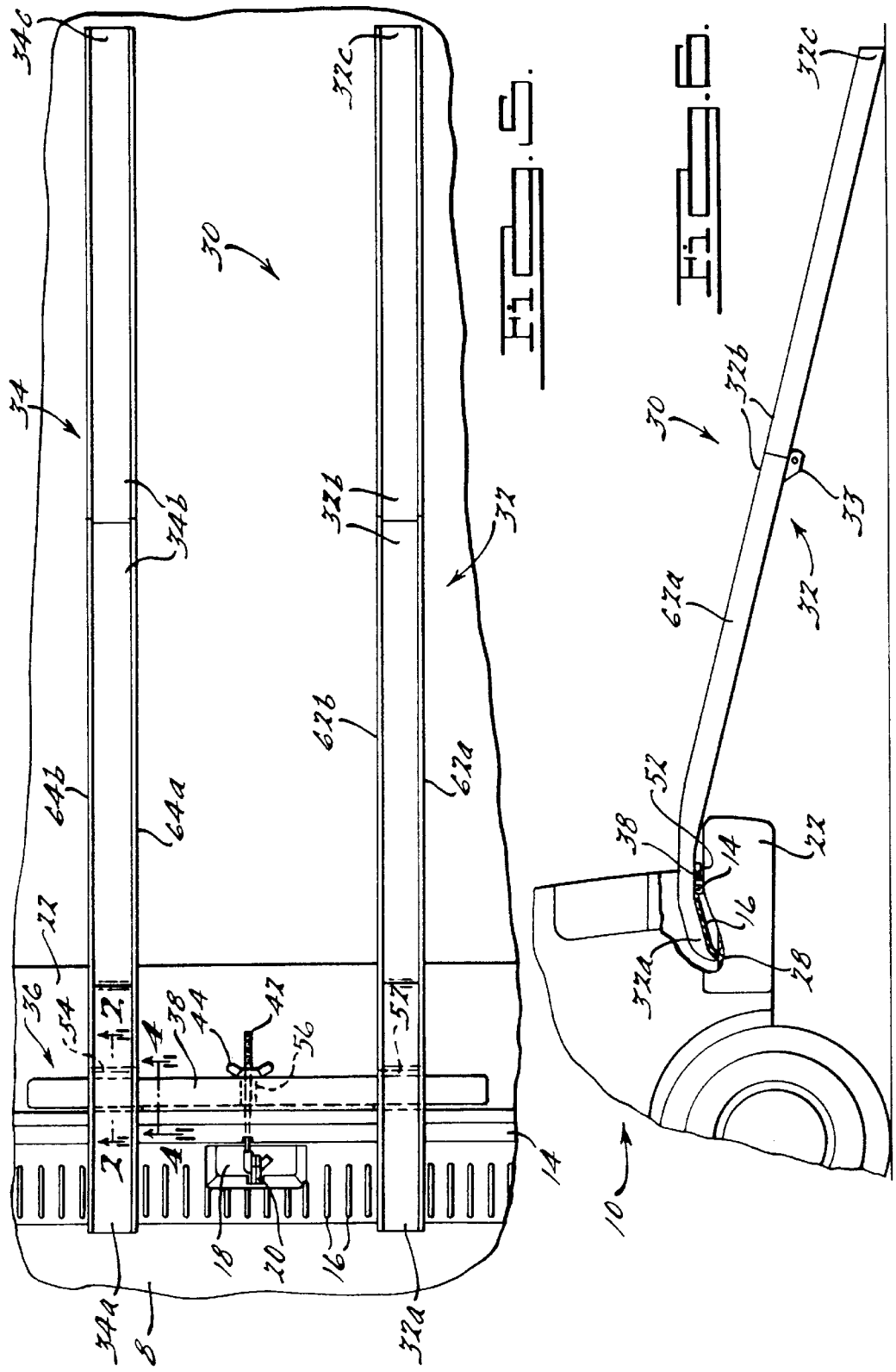

5,988,973

VEHICLE SEAT RAMP

CROSS-REFERENCE TO RELATED APPLICATION

This appicationis a Continuation-in-Part of application Ser. No. 08/538,523, filed Oct. 3, 1995, now abandoned.

BACKGROUND OF THE INVENTION

1. Field of the Invention

The present invention relates to a vehicle seat ramp apparatus for easily effectuating loading and removal of passenger seats.

2. Description of the Related Art

In the past, ramps have been used on vehicles to effectuate the removal of items such as lawn equipment and wheel chairs. It was not until automatic seat rollers were placed on passenger seats for aiding in moving of the seats toward a vehicle doorway for removal that a roller seat ramp was needed. An example of a vehicle seat assembly with retracting roller seats is found in U.S. Pat. No. 5,372,398 to Aneiros et al which issued Dec. 13, 1994. Current vehicle ramp designs do not provide a ramp with tracks that can be adjusted so that they are different widths apart to allow for the loading and removal of seats that have rollers spaced at differing widths. Moreover, prior ramps do not allow the tracks to slidably move along a center cross member that is disposed between the tracks so that the width between the tracks can be easily adjusted.

Further, prior vehicle ramps have not provided a device for latching the tracks to the vehicle so that they will not slide to one side or fall to the ground. Also lacking in the prior art is an arcuate vehicle engagement portion attached to the ramp tracks that fits over a door trim and molding of the vehicle so that the rollers of the seats do not abut against the door trim or molding during removal.

SUMMARY OF THE INVENTION

In light of such desirable characteristics, not fully present in the related art, the present invention provides a seat ramp for a vehicle. The seat ramp has at least one track member. The track member has an arcuate vehicle engagement portion, a surface engagement portion opposite the arcuate vehicle engagement portion, and a mid portion integrally formed between the arcuate vehicle engagement portion and the surface engagement portion. A sleeve is disposed underneath the track member adjacent to the arcuate vehicle engagement portion, and side guides are attached to and project vertically upward from the track member. Further provided in the present invention is a track retention apparatus that is attached to the vehicle. The track retention apparatus has a cross member that extends through the sleeve of, and is perpendicular to, the track member. The track member is slidable along the cross member. The track retention apparatus also includes means for attaching the track retention apparatus to the vehicle.

One object of the present invention is to provide a vehicle ramp design with tracks that can be adjusted so that they are different widths apart to allow for the removal of seats having seat rollers that are spaced at differing widths.

A further object of the present invention is to provide an apparatus for allowing the tracks to slidably move along a cross member that is disposed between the tracks so that the width between the tracks can be easily adjusted.

Another object of the present invention is to provide a device for easily latching the tracks to the vehicle so that they will not slide to one side or fall to the ground.

A further object of the present invention is to provide an arcuate vehicle engagement portion attached to the ramp tracks that fits over a door trim and molding of the vehicle so that the rollers of the seats do not abut against the door trim or molding during removal.

Other objects, features and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein:

FIG. 5 is a plan view of the seat ramp of the present invention.

FIG. 6 is a side elevational view of the seat ramp of the present invention showing a cut away view of a back end of the vehicle.

DESCRIPTION OF THE PREFERRED EMBODIMENT(S)

Figure 1:
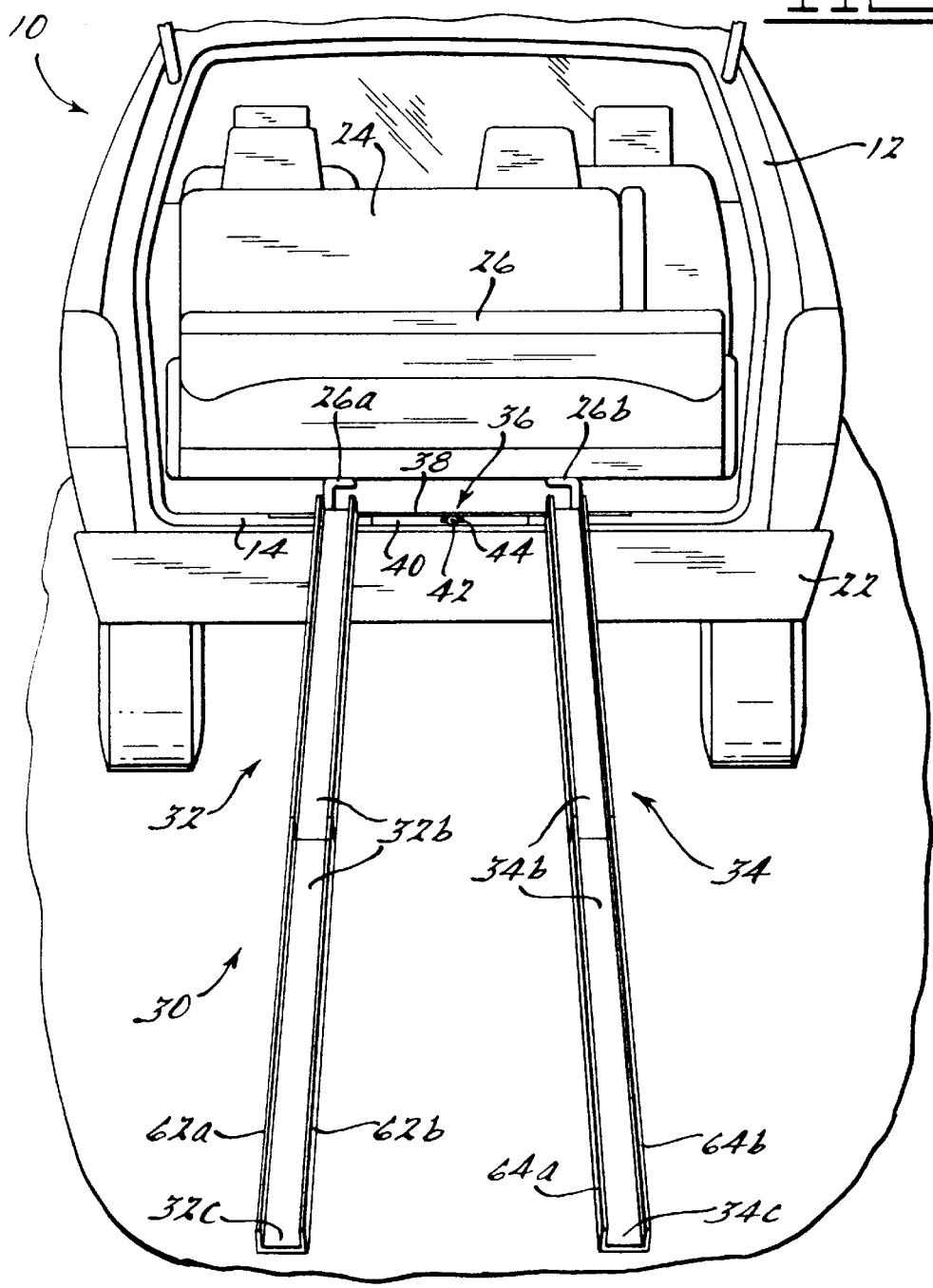
FIG. 1 is an end elevational view of the rear of a vehicle showing a seat ramp of the present invention.

Commencing with FIG. 1, a vehicle 10 is shown from the rear end. The vehicle 10 has a door frame 12 around which a door trim 14 is disposed. The vehicle 10 further includes a bumper 22 and a bench seat 24. A second bench seat 26 is shown folded or collapsed into a removal position. The bench seats 24, 26 have rollers (not shown) that are engaged when in the seat removal position. Handles 26a, 26b, attached to the seats 24, 26, are also engaged when the seats 24, 26 are in the seat removal position.

A seat ramp 30 for the vehicle 10 is also shown in FIG. 1. The seat ramp 30 has a first track 32 and a second track 34 for effectuating the insertion and removal of the seats 24, 26 of the vehicle 10. It will be appreciated by those skilled in the art, however, that a singular wide track could also be used for removal of the seats 24, 26. As is best shown in FIG. 6, the first track 32 has an arcuate vehicle engagement portion 32a, a surface engagement portion 32c opposite the arcuate vehicle engagement portion 32a, and a mid portion 32b integrally formed between the arcuate vehicle engagement portion 32a and the surface engagement portion 32c. The arcuate vehicle engagement portion 32a of the first track 32 is formed so that it abuts against, and curves over, door molding 16 and extends to contact the floor 28 of the vehicle 10.

Figure 2:
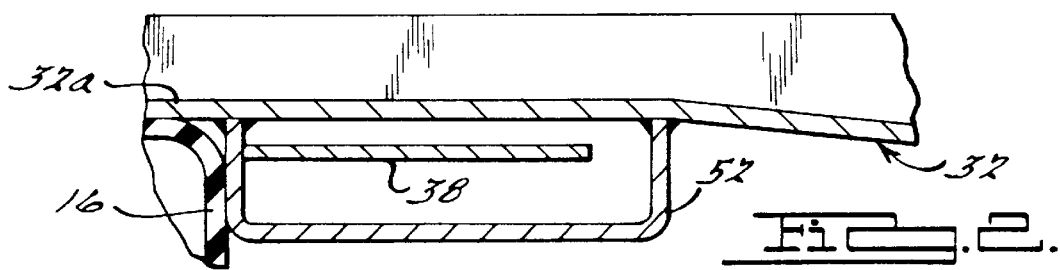
FIG. 2 is a cross sectional view of a sleeve and track retention apparatus of the present invention taken along sight line 2—2 of FIG. 5.

As shown in FIGS. 2 and 5, a sleeve 52 is attached underneath the first track 32 adjacent to the arcuate vehicle engagement portion 32a. Side guides 62a, 62b are attached to, and project vertically upward from, the first track 32. While the mid portion 32b of the first track 32 includes a hinge 33 disposed thereon for providing for folding of the first track 32 when the seat ramp 30 is not in use.

The seat ramp 30 also includes in the preferred embodiment a second track 34 that has an arcuate vehicle engagement portion 34a, a surface engagement portion 34c opposite the arcuate vehicle engagement portion 34a, and a mid portion 34b that is integrally formed between the arcuate vehicle engagement portion 34a and the surface engagement portion 34c. The arcuate vehicle engagement portion 34a of the first track 34 is formed so that it abuts against, and curves over, door molding 16 and extends to contact the floor 28 of the vehicle 10.

Referring to FIG. 5, a sleeve 54 is attached underneath the second track 34 and is adjacent to the arcuate vehicle engagement portion 34a. Side guides 64a, 64b are attached to and project vertically upward from the second track 34. While the mid portion 34b of the second track 34b includes a hinge (not shown) that is disposed thereon for folding of the second track 34. As seen in FIGS. 1, 2, and 5 a track retention apparatus 36 is attached to the vehicle 10 for securing the seat ramp 30. The track retention apparatus 36 has a cross member 38 which extends through the sleeves 52, 54 of, and is perpendicular to, the first track 32 and the second track 34. Once the first track 32 and the second track 34 are inserted onto the cross member 38 they are slidable along the cross member 38 so that the width between the tracks 32, 34 can be easily adjusted.

Figure 3:
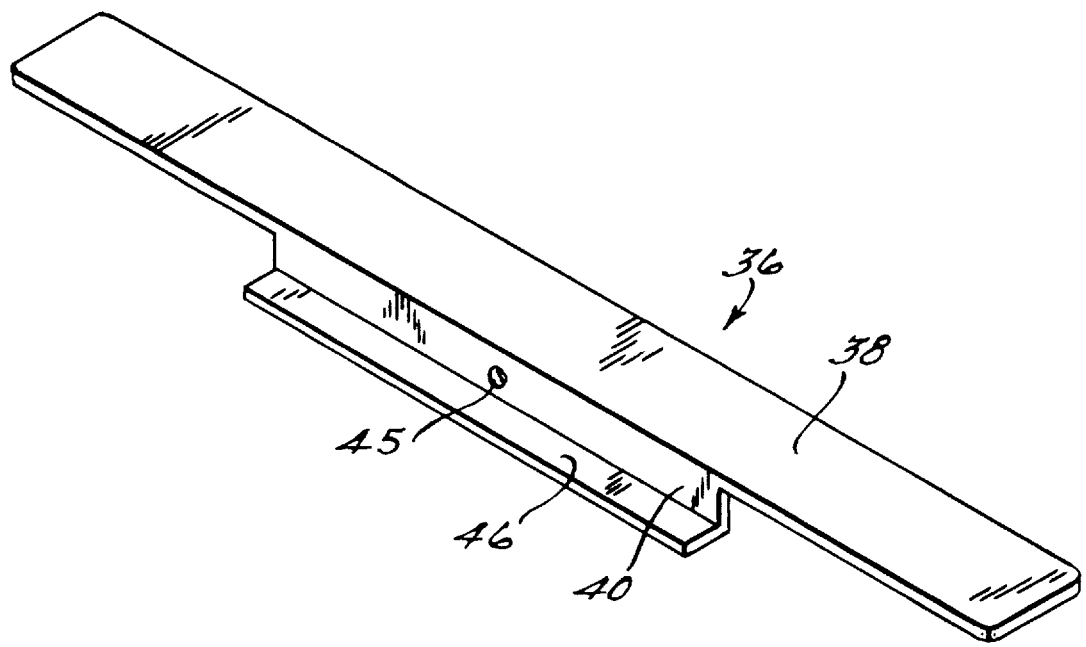
FIG. 3 is a plan view of the seat ramp of the present invention.
Figure 4:
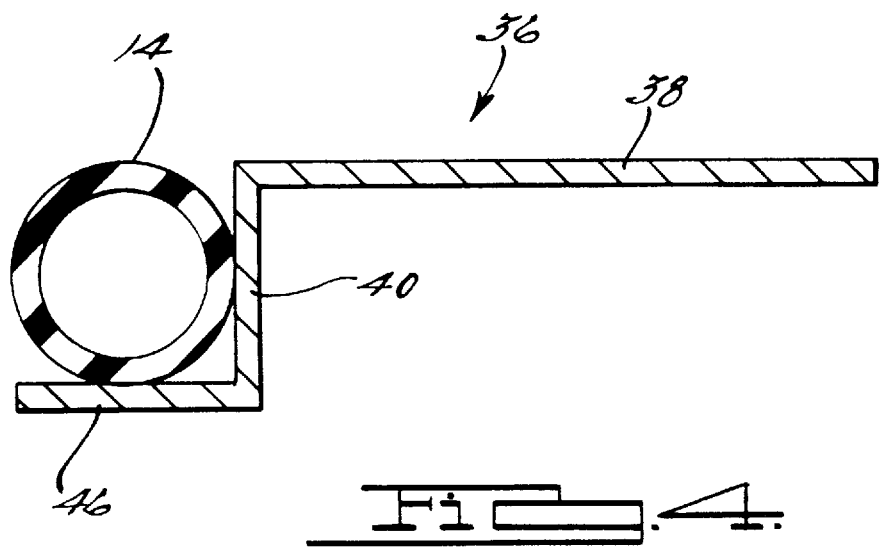
FIG. 4 is a cross sectional view of the cross member attached to a vehicle of the present invention taken along sight line 4—4 of FIG. 5.

As shown in FIG. 3, a flange 40 is attached to, and disposed underneath, the cross member 38. In the preferred embodiment the flange 40 is L-shaped and has a lip portion 46 that forms a right angle with the flange 40. The flange 40 also has an aperture 45 disposed therein. The flange 40 form an engagement fit with the door trim 14 of the vehicle 10 with the lip 46 being disposed underneath the door trim 14 means attaching the track retention apparatus 36 to the vehicle 10. In the preferred embodiment, a J-shaped bolt 42 and wing nut 44 attachment is used for securing the track retention apparatus 36 to the vehicle 10. The J-shaped bolt 42 is inserted through the aperture 45 of the flange 40 and hookingly engages a door latch member 20 of the vehicle 10. It will be appreciated by those skilled in the art that other means of attaching the track retention apparatus 36 to the vehicle 10 could also be employed such as clasps, hook and loop fasteners, etc.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A seat ramp for a vehicle, the vehicle having a door frame around which a door trim is disposed, and a door latch member, the seat ramp comprising:

at least one track member having an arcuate vehicle engagement portion, a surface engagement portion opposite the arcuate vehicle engagement portion, a mid portion integrally formed between the arcuate vehicle engagement portion and the surface engagement portion, and a sleeve attached underneath the track member adjacent to the arcuate vehicle engagement portion; and a track retention apparatus attachable to the vehicle, the track retention apparatus comprising:

a cross member extending through the sleeve of, and perpendicular to, the track member, the track member being slidable along the cross member, and the cross member carrying a flange disposed underneath the cross member and having an aperture therethrough, and means for attaching the track retention apparatus to the vehicle connected to the cross member including a device inserted through the aperture of the flange and engaging the door latch member of the vehicle.

2. A seat ramp for a vehicle, the vehicle having a door frame around which a door trim is disposed, and a door latch member, the seat ramp comprising:

a first track having an arcuate vehicle engagement portion, a surface engagement portion opposite the arcuate vehicle engagement portion, a mid portion integrally formed between the arcuate vehicle engagement portion and the surface engagement portion, a sleeve attached underneath the first track adjacent to the arcuate vehicle engagement portion; and side guides attached to and projecting vertically upward from the first track, the mid portion including a hinge disposed thereon for providing the folding of the first track;

a second track having an arcuate vehicle engagement portion, a surface engagement portion opposite the arcuate vehicle engagement portion, a mid portion integrally formed between the arcuate vehicle engagement portion and the surface engagement portion, a sleeve attached underneath the second track adjacent to the arcuate vehicle engagement portion; and side guides attached to and projecting vertically upward from the second track, the mid portion including a hinge disposed thereon for providing the folding of the second track;

a track retention apparatus attached to the vehicle, the track retention apparatus comprising:

a cross member extending through the sleeve of, and perpendicular to, the first track and the second track, the first track and the second track being slidable along the cross member, and means for attaching the track retention apparatus to the vehicle connected to the cross member including a device extending between the cross member and the door latch member of the vehicle.

* * * * *